(12) United States Patent
Crumm et al.

(10) Patent No.: US 8,343,689 B2
(45) Date of Patent: Jan. 1, 2013

(54) SOLID OXIDE FUEL CELL WITH IMPROVED CURRENT COLLECTION

(75) Inventors: Aaron Crumm, Ann Arbor, MI (US); Quinlan Y. Shuck, Ypsilanti, MI (US); Jonathan R. Rice, Whitmore Lake, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 968 days.

(21) Appl. No.: 11/566,457

(22) Filed: Dec. 4, 2006

(65) Prior Publication Data

US 2007/0141447 A1 Jun. 21, 2007

Related U.S. Application Data

(63) Continuation-in-part of application No. 10/991,268, filed on Nov. 17, 2004, now Pat. No. 7,676,329.

(60) Provisional application No. 60/520,839, filed on Nov. 17, 2003.

(51) Int. Cl.
H01M 4/64 (2006.01)

(52) U.S. Cl. ........ 429/517; 429/465; 429/466; 429/479; 429/497; 429/519

(58) Field of Classification Search .............. 429/31, 429/40, 41, 44, 465, 466, 479, 497, 517, 429/519
See application file for complete search history.

(56) References Cited

U.S. PATENT DOCUMENTS

| | | | | |
|---|---|---|---|---|
| 5,064,734 A | * | 11/1991 | Nazmy | 429/465 |
| 5,175,063 A | * | 12/1992 | Ishihara et al. | 429/32 |
| 5,273,839 A | * | 12/1993 | Ishihara et al. | 429/456 |
| 6,420,686 B1 | | 7/2002 | Benoit et al. | |
| 6,452,139 B1 | | 9/2002 | Benoit et al. | |
| 6,492,050 B1 | | 12/2002 | Sammes | |
| 6,557,252 B2 | | 5/2003 | Bennett et al. | |
| 6,561,722 B1 | | 5/2003 | Dudko et al. | |
| 6,623,881 B2 | | 9/2003 | Badding et al. | |
| 6,696,187 B2 | | 2/2004 | Kendall et al. | |
| 6,737,186 B2 | | 5/2004 | Janousek et al. | |
| 6,749,799 B2 | | 6/2004 | Crumm et al. | |
| 6,777,126 B1 | | 8/2004 | Allen | |
| 2002/0076595 A1 | * | 6/2002 | Badding et al. | 429/31 |
| 2002/0182468 A1 | * | 12/2002 | Janousek et al. | 429/30 |
| 2002/0192538 A1 | | 12/2002 | Tanahashi et al. | |
| 2003/0035989 A1 | * | 2/2003 | Gorte et al. | 429/30 |
| 2003/0134170 A1 | * | 7/2003 | Sarkar et al. | 429/31 |
| 2003/0203263 A1 | | 10/2003 | Brown et al. | |
| 2003/0235743 A1 | | 12/2003 | Haltiner, Jr. | |
| 2004/0018409 A1 | | 1/2004 | Hui et al. | |
| 2004/0028994 A1 | | 2/2004 | Akikusa et al. | |
| 2004/0033404 A1 | * | 2/2004 | Champion et al. | 429/32 |
| 2004/0081878 A1 | | 4/2004 | Mardilovich et al. | |
| 2004/0101742 A1 | | 5/2004 | Simpkins et al. | |
| 2004/0161659 A1 | | 8/2004 | Lloyd et al. | |
| 2004/0166390 A1 | | 8/2004 | Agnew et al. | |
| 2004/0185321 A1 | | 9/2004 | Sutherland et al. | |
| 2004/0191587 A1 | | 9/2004 | Kendall et al. | |

* cited by examiner

*Primary Examiner* — Patrick Ryan
*Assistant Examiner* — Ben Lewis
(74) *Attorney, Agent, or Firm* — Endurance Law Group PLC (57) ABSTRACT

A solid oxide fuel cell includes a plurality of tubes, with each tube including an anode, a cathode and an electrolyte, A mechanically compliant anode current collector is associated with each tube. An interconnect portion may be attached to the anode current collector. A cathode current collector is also associated with each tube. The interconnect portion provides an oxygen barrier between the anode current collector and the cathode current collector.

24 Claims, 12 Drawing Sheets

SOLID OXIDE FUEL CELL WITH IMPROVED CURRENT COLLECTION

CROSS-REFERENCE TO RELATED APPLICATIONS

This application is a continuation-in-part of U.S. patent application Ser. No. 10/991,268 filed on Nov. 17, 2004, which claims priority benefit of U.S. provisional patent application No. 60/520,839 filed on Nov. 17, 2003.

FIELD OF THE INVENTION

This invention relates to improved current collection for solid oxide fuel cells and more particularly, to current collection for solid oxide fuel cells of lightweight design.

BACKGROUND OF THE INVENTION

A solid oxide fuel cell (SOFCs) is a type of fuel cell which reacts a fuel gas with an oxidant to generate DC electric current. SOFCs may have an anode, an electrolyte and a cathode, and have been made from a variety of materials and in a variety of geometries. Fuel processing is required to render hydrocarbon fuels (such as propane, butane, etc.) suitable for SOFCs. For example, known designs for fuel processors include those done with a separate external reactor where a catalytic substrate processes a hydrocarbon fuel such as butane ($C_4H_{10}$), propane ($C_3H_8$) or diesel fuel (JP-8 or JET-A) to a suitable fuel gas such containing carbon monoxide (CO) and hydrogen ($H_2$). CO and Hydrogen gas are then oxidized at an active area of a SOFC to carbon dioxide and water, with DC current generated. Non hydrocarbon fuels such as ammonia ($NH_3$) can also be transformed into SOFC fuel using one or more catalytic reactions.

Current collectors are used on known SOFCs to collect electric current generated by the fuel cell. Good electrical conductance is important for increasing recovery of the electrical energy generated by the fuel cell. However, the harsh environment of a fuel cell can make current collection difficult. Fuel cell current collectors must be chemically and thermally robust, as they are exposed to oxidative stresses, reductive stresses, and operating temperatures in the range of about 600-950° C. Known current collectors used in tube-shaped SOFC designs include the so-called "Westinghouse" design where a strip of a lanthanum-chromite ceramic runs along the length of the fuel cell, and a nickel felt electrically connects an electrode of one tube to an electrode of another tube. This design is disadvantageous for several reasons, including the expense of the ceramic, the fact it is a relatively low strength and brittle material, and that each tube must be rigidly connected to its adjacent tube. Portable fuel cell designs can be subject to physical stresses and shocks, etc., and low strength, brittle materials are ill suited for such use.

It has also been known to use silver wires as current collectors, as they are capable of operating in high temperatures and are resistant to oxidation. Known designs have used silver wire wrapped around the cathode of a tubular SOFC in a spiral fashion. Such spiral wires, however, do not make reliable electric contacts as they can move with respect to the tube. This is true even if tightly attached when assembled, as elastically tight fits are relaxed at the high operating temperatures of fuel cells.

It would be desirable to provide a solid oxide fuel cell with a current collector of a simple, lightweight design which is also robust in construction and capable of withstanding thermal cycling and expected physical stresses.

SUMMARY OF THE INVENTION

In accordance with a first aspect, a solid oxide fuel cell includes a plurality of tubes, with each tube having an anode, a cathode and an electrolyte. An anode current collector is associated with each tube. The anode current collector is mechanically compliant relative to the plurality of tubes. The current collector includes a low resistance stem portion and a brush portion extending radially out from the stem portion.

In another aspect, a solid oxide fuel cell includes a plurality of tubes, with each tube including an anode, a cathode and an electrolyte. A mechanically compliant anode current collector is associated with each tube. An interconnect portion is attached to the anode current collector. A cathode current collector is also associated with each tube. The interconnect portion provides an oxygen barrier between the anode current collector and the cathode current collector.

It should be understood that the appended drawings are not necessarily to scale, presenting a somewhat simplified representation of various preferred features illustrative of the basic principles of the invention. The specific design features of the solid fuel cell as disclosed here, including, for example, specific dimensions of the catalytic substrate will be determined in part by the particular intended application and use environment. Certain features of the illustrated embodiments have been enlarged or distorted relative to others for visualization and clear understanding. In particular, thin features may be thickened, for example, for clarity of illustration. All references to direction and position, unless otherwise indicated, refer to the orientation of the solid state electrochemical device illustrated in the drawings.

DETAILED DESCRIPTION OF THE PREFERRED EMBODIMENTS

It will be apparent to those skilled in the art, that is, to those who have knowledge or experience in this area of technology, that many uses and design variations are possible for the fuel cells disclosed herein. The following detailed discussion of various alternative and preferred features and embodiments will illustrate the general principles of the invention with reference to current collection for use with a solid oxide fuel cell ("SOFC"). Other embodiments suitable for other applications will be apparent to those skilled in the art given the benefit of this disclosure.

Figure 1:
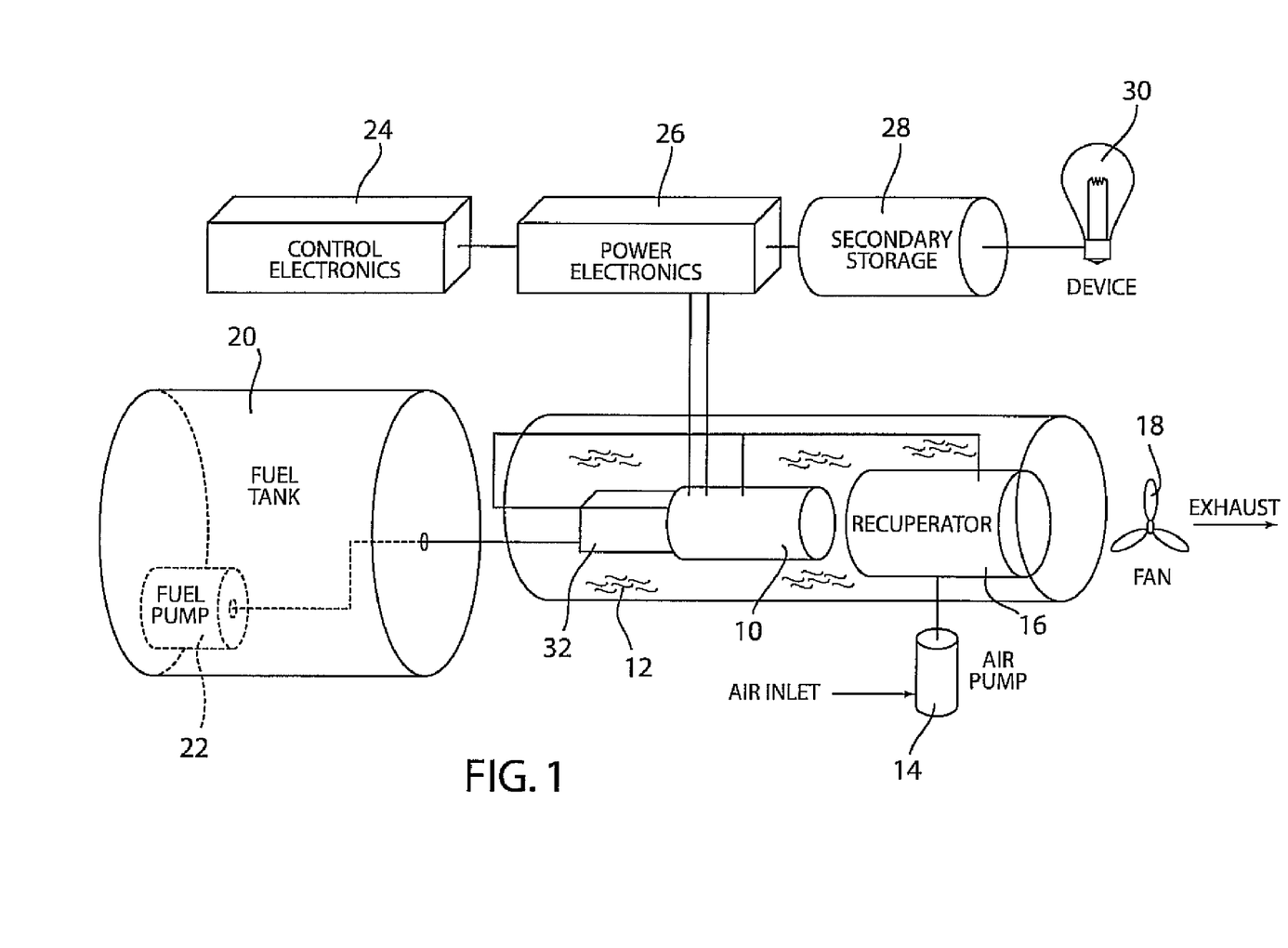
FIG. 1 is a schematic of a solid oxide fuel cell with internal processing in accordance with a preferred embodiment.

FIG. 1 is a schematic of a solid oxide fuel cell 10 and surrounding componentry in accordance with a preferred embodiment. The fuel cell 10 generates power to run a load or device 30 or to provide power to a secondary device 28 (such as charging a battery). Control electronics 24 and power electronics 26 may be mounted to control the power generation of the SOFC. A fuel tank 20 contains a fuel (typically butane, propane, diesel, JET-A, etc.) and a fuel regulator or pump 22 delivers the fuel into a thermal enclosure 12 defined by insulation. An air pump 14 pumps air into the thermal enclosure.

Figure 2:
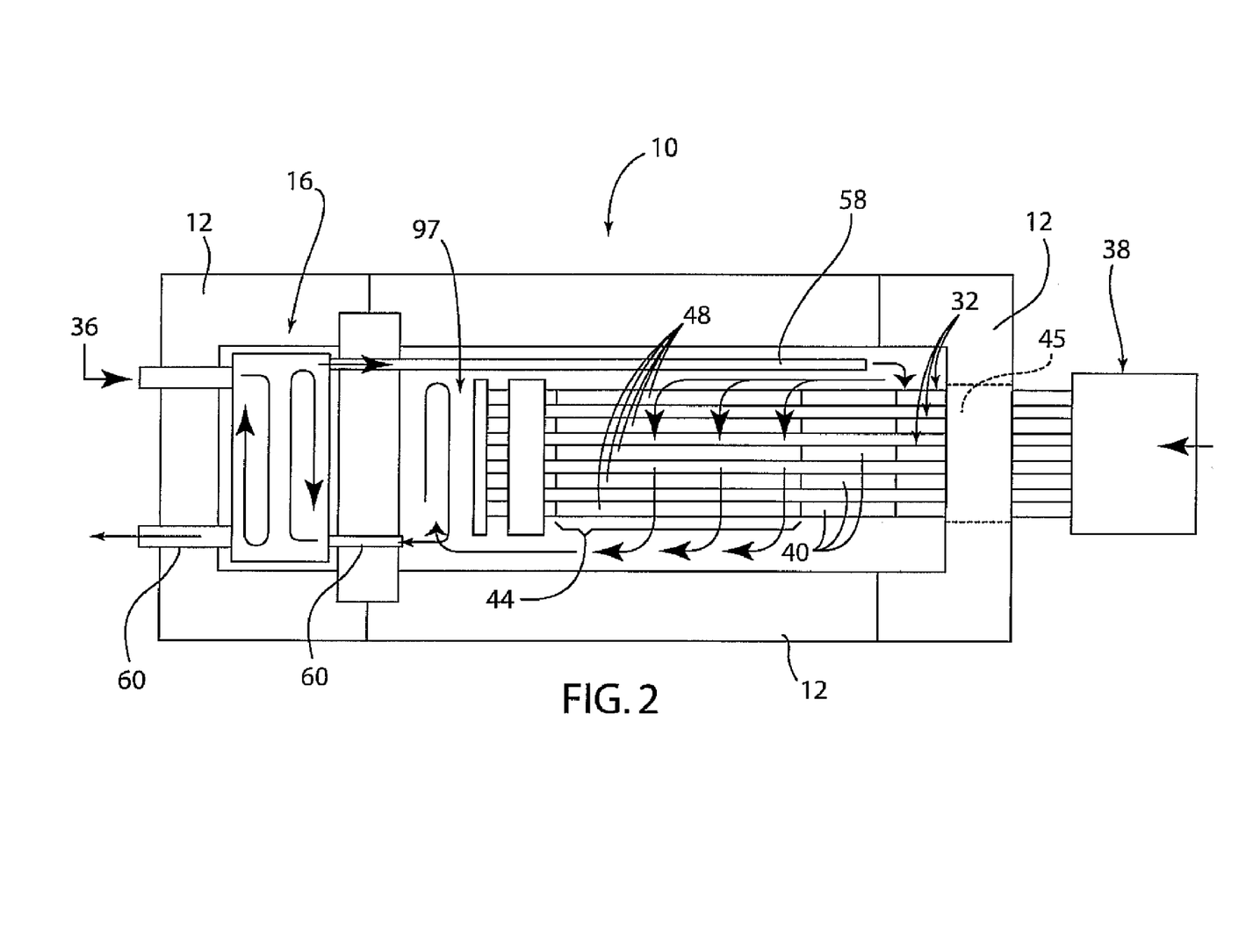
FIG. 2 is a schematic cross section view of the solid oxide fuel cell of FIG. 1.

The SOFC 10 generates significant heat during operation (on the order of 600-950° C.) and is preferably mounted within the thermal enclosure 12. The SOFC is most efficient at these high temperatures, and therefore several design features have been incorporated to heat incoming fuel gas and incoming air at the thermal enclosure 12. FIG. 2 shows a schematic of a the thermal enclosure of FIG. 1. The air pump pumps air from a cold air inlet 36 to a recuperator 16. The recuperator is essentially a heat exchanger which transfers some of the heat from exhaust to the incoming air supplied to the cathode. Ambient air for fuel processing is supplied to mix with the fuel in a fuel air mixer 38 in a predetermined ratio, preferably having a sub-stoichiometric quantity of oxygen so that processing of the fuel gas takes place at the catalytic substrate 32 as described in greater detail below. Processing is understood here to mean conversion of a fuel to a processed gas which can be used by the SOFC 10, typically containing carbon monoxide and hydrogen gas. The heated air circulates along the active area and participates in electrochemically transforming the fuel gas into electricity and exhaust gases.

Figure 3:
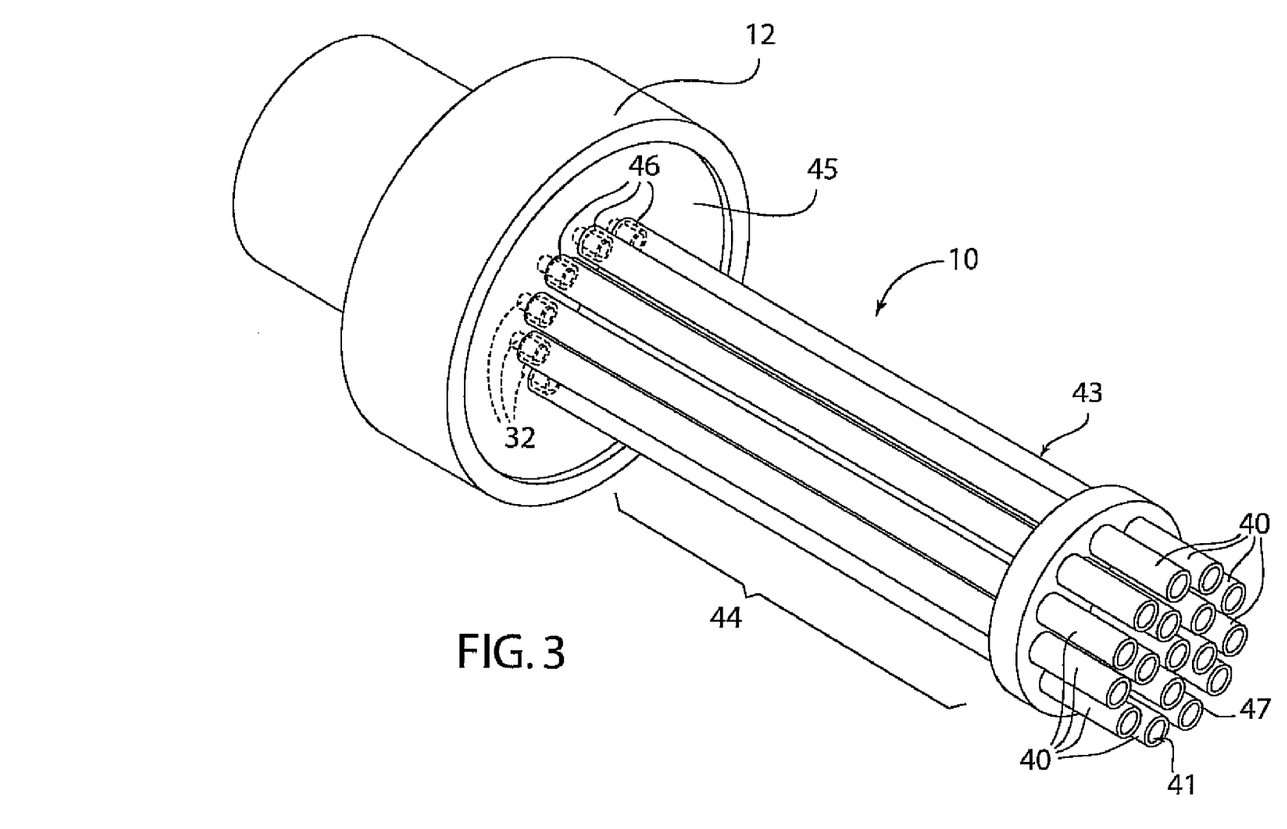
FIG. 3 shows a manifold and a series of SOFC tubes.

The fuel-air mixture is introduced into the thermal enclosure through a series of tubes 40. The actual number of tubes depends in part on the desired power output of the SOFC. A plurality of tubes is preferably mounted on a manifold 45. As seen in FIG. 3, each tube 40 has an interior 41 and an exterior 43. Preferably an anode material is positioned on the interior, and an electrolyte 47 exteriorly surrounds the anode. The entire tube 40 may have an interior layer of anode and a layer of electrolyte circumferentially surrounding the anode, so that the anode is remote from the exterior 43 of the tube and the electrolyte is remote from the interior 41 of the tube. A cathode 48 is positioned around the exterior 43 of the tube 40, defining an active area 44, also preferably remote from the interior of the tube. The anode and electrolyte may be formed together by coextrusion; alternatively, the anode may be formed first and the electrolyte and cathode added in later steps.

Fuel gas flows from the manifold 45, then to the catalytic substrate 32, and then to the active area 44 within each tube. The catalytic substrate may be positioned immediately preceding (in terms of fuel gas flow) the active area and within the thermal enclosure so that heat generated at the catalytic substrate helps preheat the fuel gases. That is, air from air inlet 36 passes through the recuperator 16 and is heated by an exhaust stream of gases moving separately through the recuperator. For further heating, the air travels through an air inlet tube 58 past the active areas 44 of the fuel cells to an area generally adjacent the catalytic substrates 32. Residual oxygen in the heated inlet air is used to completely combust any residual fuel in the exhaust stream at the burner region 97. A catalytic element may be positioned at the burner region to help with combustion, Once the reaction is complete, exhaust gas is routed through exhaust tube 60, through the recuperator 16, and out of the thermal enclosure. Thus, the major inlets and outlets to the thermal enclosure are air inlet 36, fuel gas inlet 38, and exhaust gas outlet 60.

Such fuel cell designs are advantageously relatively light in weight, and provide good power density to mass ratios. As an example of a lightweight design each tube 40 can comprise a 1 mm-20 mm diameter tube. Thin, lightweight tubes are also advantageous in that the tubes hold less heat, allowing the fuel cell to be heated rapidly. The tubes preferably have at least three layers, an inner layer of anode, a middle layer of electrolyte, and an outer layer of cathode. The anode comprises, for example, a porous cermet of nickel and yttria stabilized zirconia (YSZ). The electrolyte can comprise a thin membrane of YSZ. The cathode can comprise, for example, a porous lanthanum strontium manganate (LSM). An example of a suitable fuel cell tube shaped anode, electrolyte and cathode is disclosed in U.S. Pat. No. 6,749,799 to Curmm et al, entitled METHOD FOR PREPARATION OF SOLID STATE ELECTROCHEMICAL DEVICE and hereby incorporated by reference. Other material combinations for the anode, electrolyte and cathode, as well as other cross section geometries (triangular, square, polygonal, etc.) will be readily apparent to those skilled in the art given the benefit of this disclosure.

Figure 4:
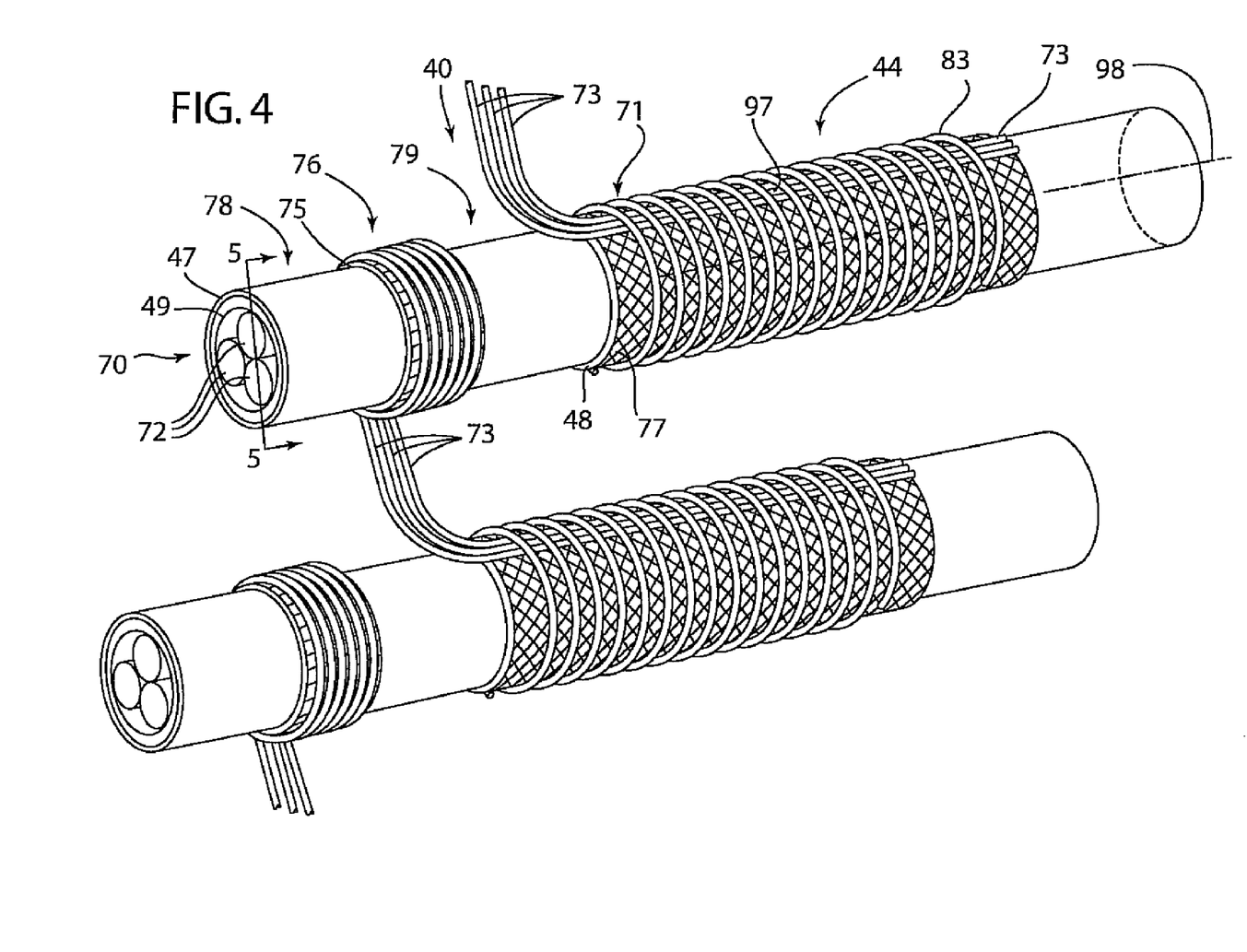
FIG. 4 shows a pair of SOFC tubes with anode and cathode current collectors.

Anode and cathode current collectors 70, 71 may be mounted within and around the tubes 40, respectively, preferably at or near the active area 44 to capture electric current generated when the fuel gases traveling inside the tubes 40 are completely oxidized (FIG. 4). Extending along the length of the tube 40 along its interior 41 is the anode 49, and extending circumferentially around the anode 49 is the electrolyte 47. Advantageously, the cathode 48 need only be positioned at the active area 44, shown in FIG. 4 positioned circumferentially around at least part of the tube. The catalytic substrate 32 is positioned within the tube and spaced upstream (as defined by flow of fuel gas) from the active area 44. A spacer element 46 may be provided which physically isolates the catalytic substrate 32 from the tube 40.

Figure 10:
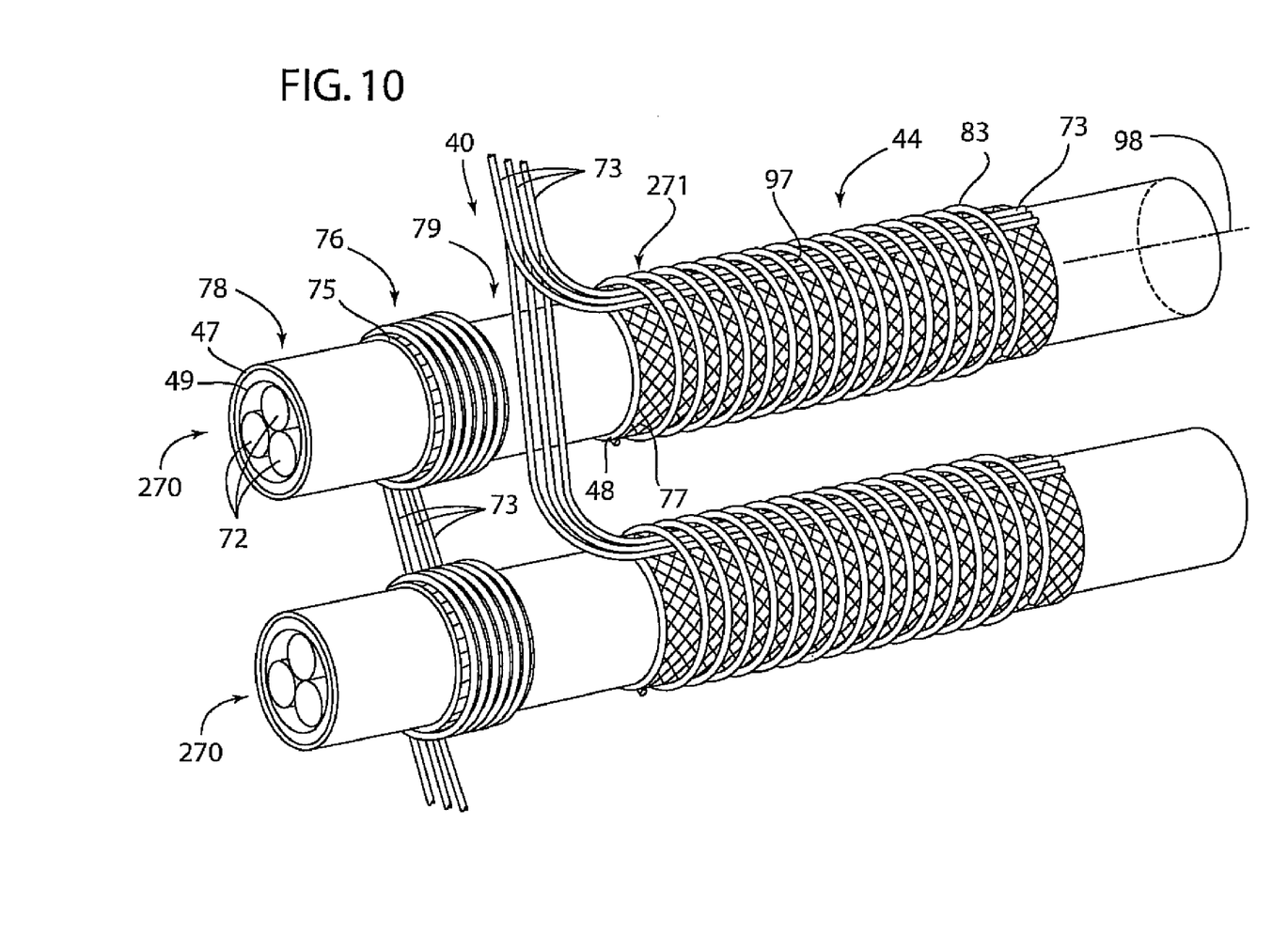
FIG. 10 is an alternate preferred embodiment where the plurality of tubes is electrically connected in parallel.

FIG. 4 shows one preferred embodiment of how electric current is generated and transferred from each tube using current collectors where the tube's electrodes are electrically connected in series. A series connection of multiple tubes produces DC power at a voltage which is a sum of the potential of the individual tubes. Alternatively, as shown in FIG. 10, the tube's electrodes are electrically connected in parallel, which produces DC power at a low potential, but with a large current representing the sum of the current generated by each tube. Anode current collector 270 is connected between anodes of corresponding tubes, and cathode current collector 271 is connected between cathodes of corresponding tubes. It will be readily apparent to those skilled in the art, given the benefit of this disclosure, that fuel designs having a plurality of tubes may also have a combination of some tubes connected in series and some connected in parallel.

As shown in FIG. 4 the cathode current collector 71 electrically connects the cathode 48 of one tube to the anode 49 of another tube. The cathode current collector is exposed to air (oxygen) and high temperatures, and therefore must not melt and must be resistant to oxidative stress. The cathode current collector 71 preferably comprises ribbons of metal or wires and a cathode contact 77. The tube 40 has a longitudinal axis 98, and in accordance with a highly advantageous feature, the cathode current collector comprises at least one wire 73 which has a linear segment 97 extending parallel to the longitudinal axis 98 of the tube. The linear segments 97 of several wires are snugly wedged against an entire length of the cathode contact 77 or cathode 48 (corresponding to the active area 44) to increase current carrying capability. A spiral wire 83 is wrapped around the linear segments 97, and helps to hold the linear segments to the cathode contact and helps collect current generated circumferentialy. The wires can comprise, for example, fine gauge wire allowing the wires to be somewhat flexible. A single large gauge wire may be too stiff, as it is advantageous to allow for some play in the fuel cell to absorb energy when subjected to irregular stresses. Irregular stresses and shock loading would be expected with a portable, lightweight solid oxide fuel cell. An example of a suitable wire for use in such cathode current collector is 250 micron silver wire. The wires can also comprise, for example platinum, palladium, gold, alloys of the aforementioned metals and iron, nickel and cobalt-based alloy oxidation resistant at 900° C., known to those skilled in the art as high temperature alloys.

Figure 7:
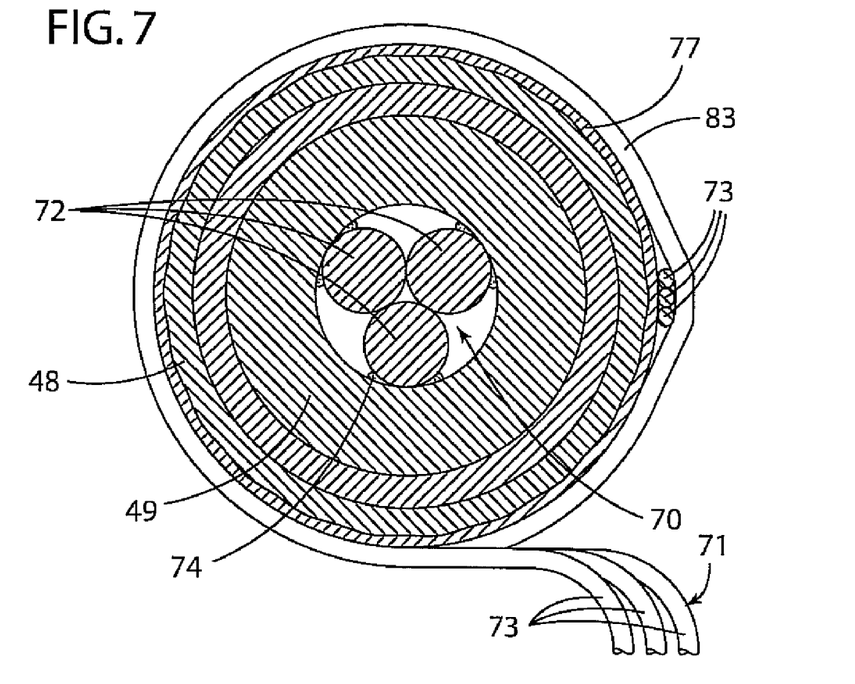
FIG. 7 is a cross section view taken along lines 7-7 in FIG. 4, at the active area.

In general it is desirable to reduce ohmic loss and cathode overpotential. Further, any materials applied over the cathode must be electrically conductive (so that electrons generated as a result of the electrochemical reaction of the fuel cell can be collected) and permeable to oxygen (so that oxygen can reach the active area and enter the electrochemical reaction). In accordance with a highly advantageous feature, it has been found that application of silver metal at the cathode reduces ohmic loss and cathode overpotential. One example of such a cathode contact 77 is the application of a SPI 5002 HighPurity Silver Paint from Structure Probe, Inc. silver paint over the active area 44 in a layer about 10 to 40 microns thick. FIG. 7 shows the cathode contact in cross section positioned on the cathode 48.

Figure 5:
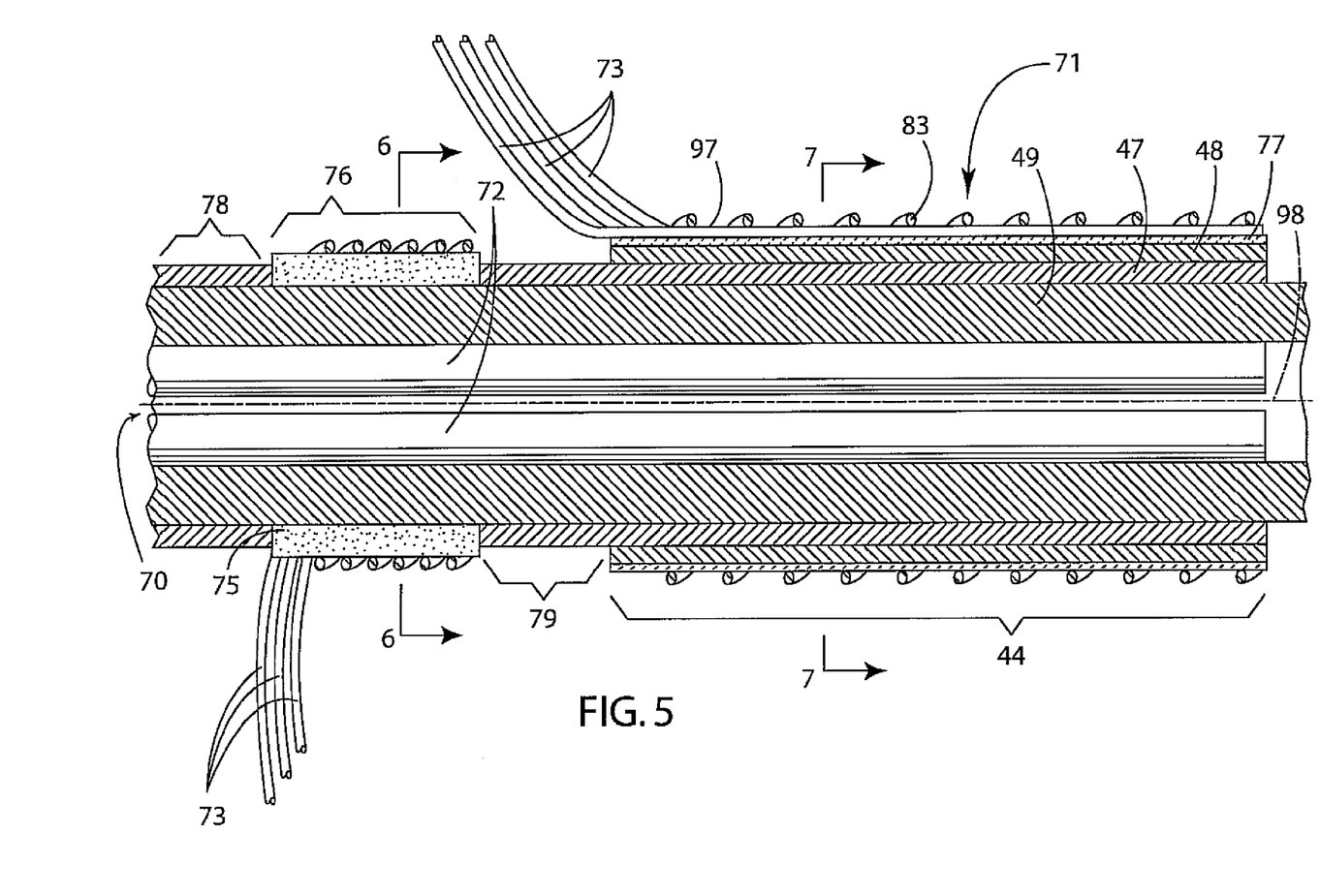
FIG. 5 is an axial cross section taken along the lines 5-5 in FIG. 4.
Figure 6:
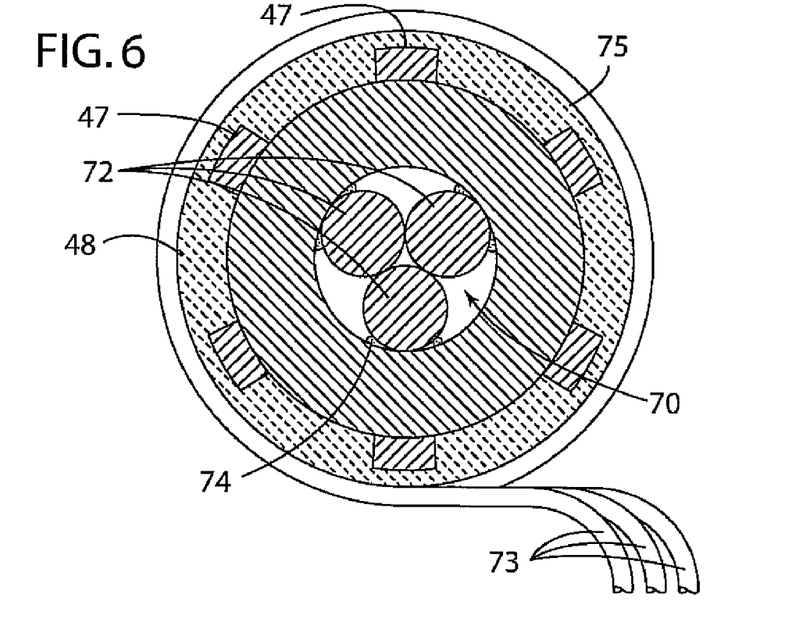
FIG. 6 is a cross section view taken along line 6-6 in FIG. 4, at an interconnect area.
Figure 8:
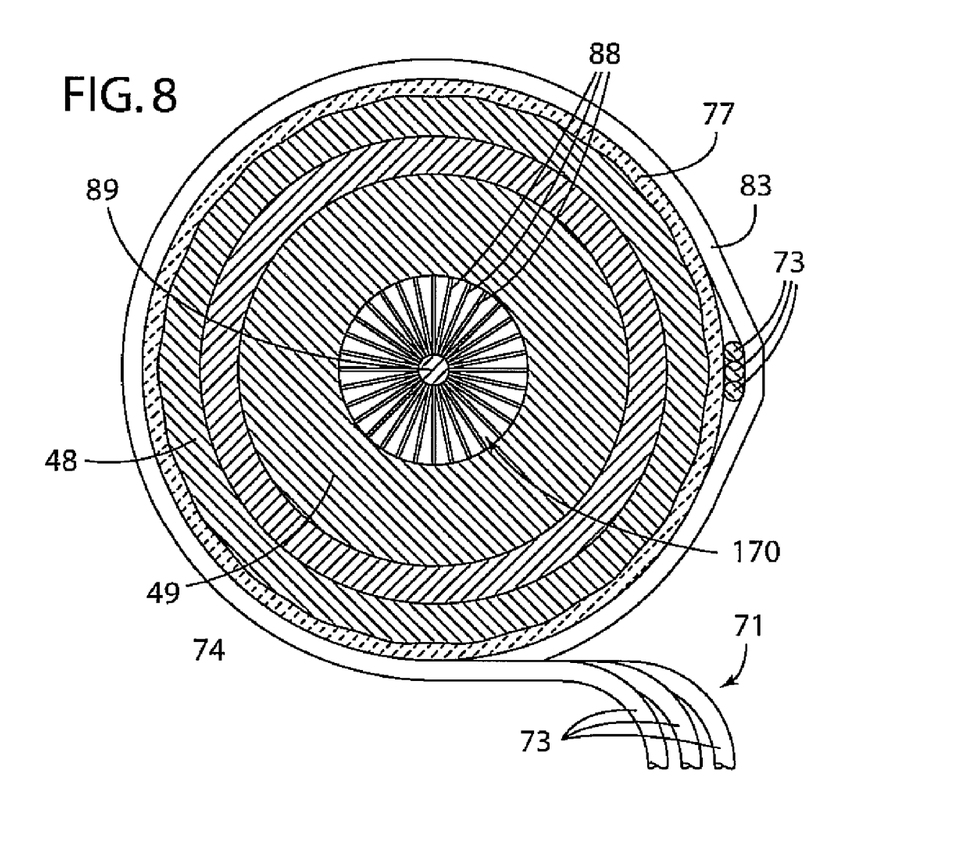
FIG. 8 is an alternate preferred embodiment of the anode current collector using a brush.

FIG. 5 is a cross section view taken through one of the tubes of FIG. 4. The anode current collector 70 is shown as a series of one or more wires 72 extending in the lumen of the tube adjacent anode 49. FIG. 6 is taken along line 6-6 in FIG. 5 at the interconnect area 76 and shows three wires, all in electrical contact with one another. The wire diameters may preferably be set so that the three wires fit snugly inside the tube to promote good electrical contact with that anode while leaving space between the wires for the passage of gas. The electrolyte 47 is shown as only partially removed from the interconnect area 76. Alternatively, the entire electrolyte may be removed. Preferably the wires may be inserted at one end of the tube and extend past the burer area 78, along both the interconnect area 76, past the gap area 79 and then extend along the active area 44. Alternatively the wires can be replaced with a ribbon or a brush 87 having a stem wire 89 and fill wire 88, as shown in the alternate preferred embodiment of the anode current collector 170 shown in FIG. 8. The wires or brushes can comprise an electrically conducting metal. Since the wires are positioned in the processed fuel gas (an atmosphere with little oxygen) and the operating temperatures are lower than known fuel cells, advantageously the wires may be made of copper or a copper alloy.

In accordance with a highly advantageous feature, it has been found that current collection is enhanced when the anode current collector 70 further comprises an anode contact 74 which physically and electrically connects the anode 49 to the wires 72. The anode contact 74 should be porous to the fuel gas and can comprise, for example, a paint containing copper oxide which is applied to the wire or wires 72 prior to their insertion into the tubes. Upon heating in the fuel gas atmosphere, the copper oxide particles in the paint reduce to copper metal, creating a porous sintered metal contact 74 between the wires 72 and the anode 49. Other materials suitable for creating a porous contact include metal oxides such as nickel oxide.

Electrical connection is required between a current collector and the anode within the tube. However, the electrolyte is not electrically conductive, and forms an electrically nonconductive gap 79 around the exterior of each tube between the active area 44 and the interconnect area 76. Electrical connection between the anode and outside the tube is accomplished at the interconnect area 76, where a conductive sealant 75 is applied. In addition to being electrically conductive, the conductive sealant 75 must also be oxidative and reductive resistant, it must be relatively insensitive to high temperatures, it must be gas impermeable (not porous) and it must bind to the substrate below, the anode 49. As an example of a suitable material for the conductive sealant 75 a noble metal or noble metal alloy may be used which extends circumferentially around the anode 49. An example is the platinum frit Conductrox 3804 Pt Conductor manufactured by Ferro Electronic Materials. Other materials suitable for use as a conductive sealant will be readily apparent to those skilled in the art given the benefit of this disclosure.

In operation, processed fuel gas flows through each of the tubes, arriving at the active area 44 first, then passing the insulating gap area 79. Gap 79 is insulating on the exterior of the tubes, as the anode and any conducting materials at the interior of the tube with respect to the electrically nonconducting electrolyte. From the gap area, the exhaust gases and remaining processes gases pass through the interconnect area 76 to the burner area 78 where any remaining processed gas may be burned. Advantageously, the anode current collector wires need only extend from the burner region to the active area.

Figure 9:
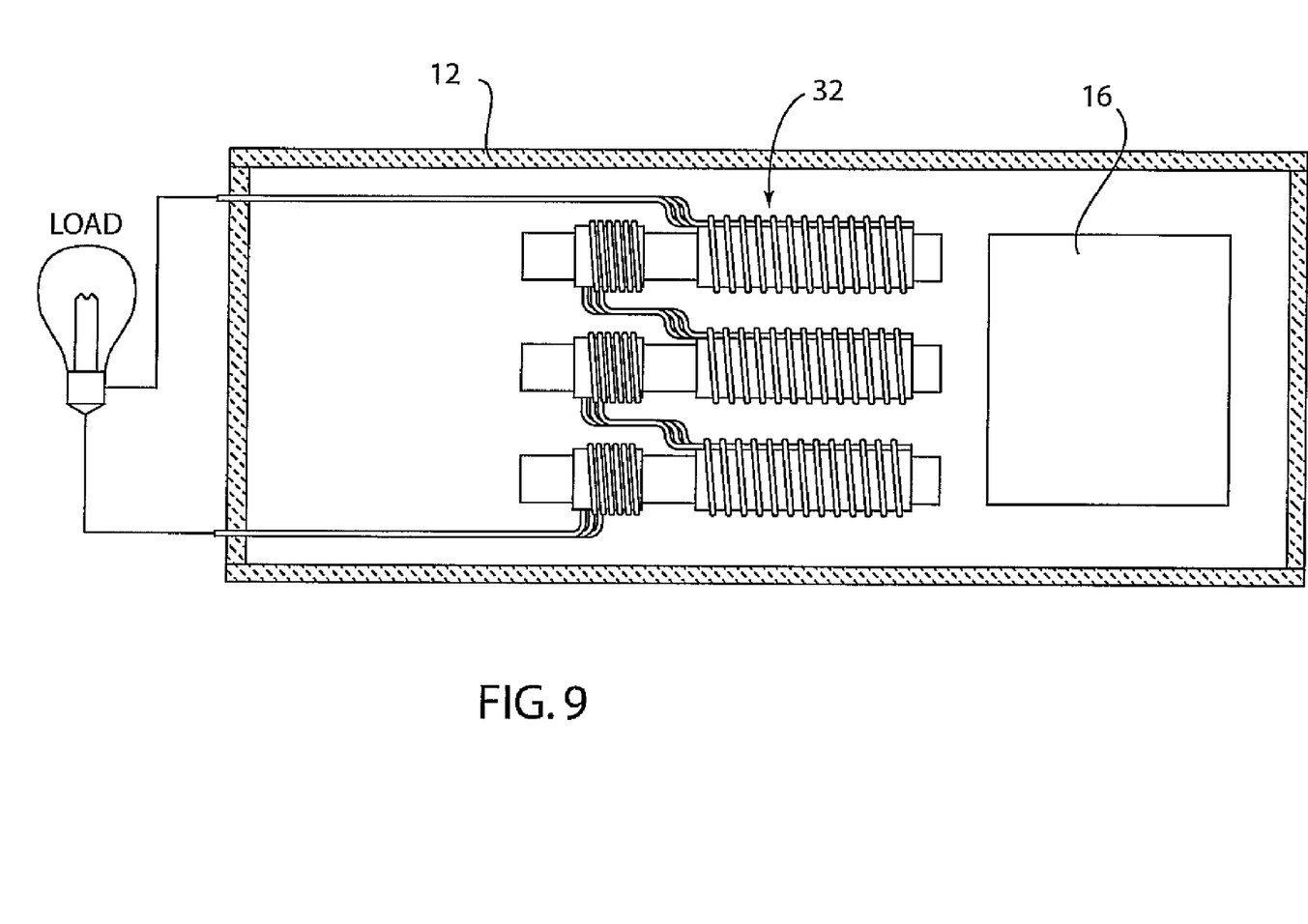
FIG. 9 is a simplified schematic showing just two wires exiting the thermal enclosure, providing power to a load.

Whether the electrodes of the tubes are electrically connected in series or in parallel, the cathode and anode current collectors 70, 71 are designed to collect current from all of the tubes and transmit that current out of the thermal enclosure 12. When connected in series, all but a last one of the cathode current collectors 71 connects the cathode of one tube to the anode of another tube. As shown schematically in FIG. 9, the anode current collector wire from the last anode and the cathode current collector wire from the last cathode in a chain of SOFC tubes connected in series are electrically connected to an external electrical load. Advantageously, only two sets of silver wires leave the thermal enclosure 12, reducing heat loss from the thermal enclosure, one set from the last cathode, and one set from the last anode, at the interconnect area.

Figure 11:
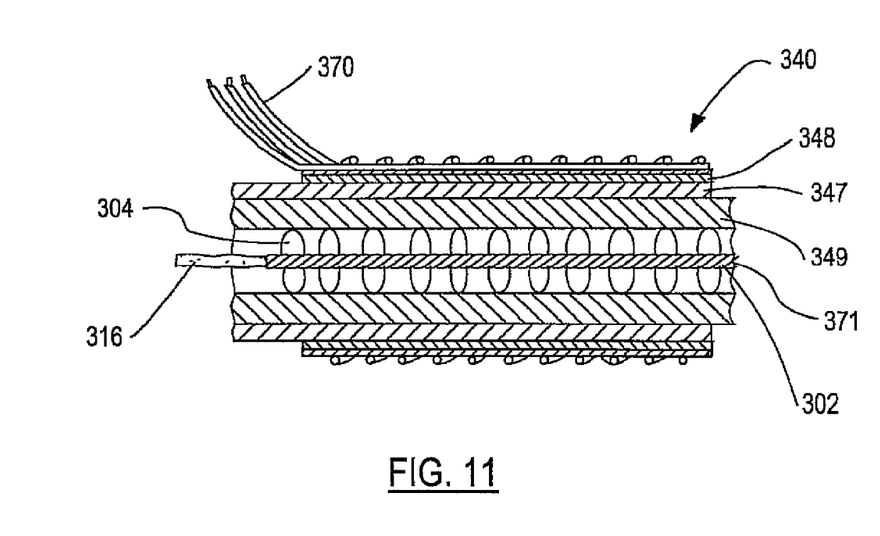
FIG. 11 is a sectional view of an alternative embodiment of a tube detailing the anode and cathode.

Referring to FIG. 11, there is shown an alternative embodiment of a solid oxide fuel cell 310. The alternative embodiment includes a plurality of tubes 340 with one being shown in FIG. 11 and two tubes 340 connected in series shown in FIG. 12. Each tube 340 has an anode 349, a cathode 348, and an electrolyte 347. An anode current collector 371 is associated with each tube 340. The anode current collector 371 is mechanically compliant relative to the plurality of tubes 340.

Referring to FIGS. 13, 14, 15 and 16, there are shown several embodiments of current collectors 371 for an electrochemical device. The current collector 371 includes a low resistance stem portion 302 and a brush portion 304 that extends radially out from the stem portion 302. As stated above, the current collector 371 is mechanically compliant relative to an electrode of the electrochemical device. In one aspect, the electrochemical device is a solid oxide fuel cell 310 and the electrode is an anode 349 of a solid oxide fuel cell 310. The low resistance stem portion 302 may include at least two twisted wires or alternatively the stem portion 302 may include a ribbon wire or a single wire. The brush portion 304 may include a wire looped with the stem portion 302. In one aspect, the stem portion 302 and brush portion 304 may be unitary such that the brush portion 304 is interconnected with the stem portion 302.

The stem portion 302 and brush portion 304 may be formed of a metal material that is compatible with a reducing atmosphere and operating temperature of a solid oxide fuel cell. The stem portion 302 may be formed of a different metal material than the brush portion 304 or alternatively the stem and brush portions 302, 304 may be formed of the same material. Various materials may be used for the stem and brush portions 302, 304 and include materials selected from copper, nickel, cobalt, iron, tungsten, molybdenum, tantalum, niobium, silver, gold, platinum, and alloys, blends, coatings and claddings of the above materials.

Figure 15:
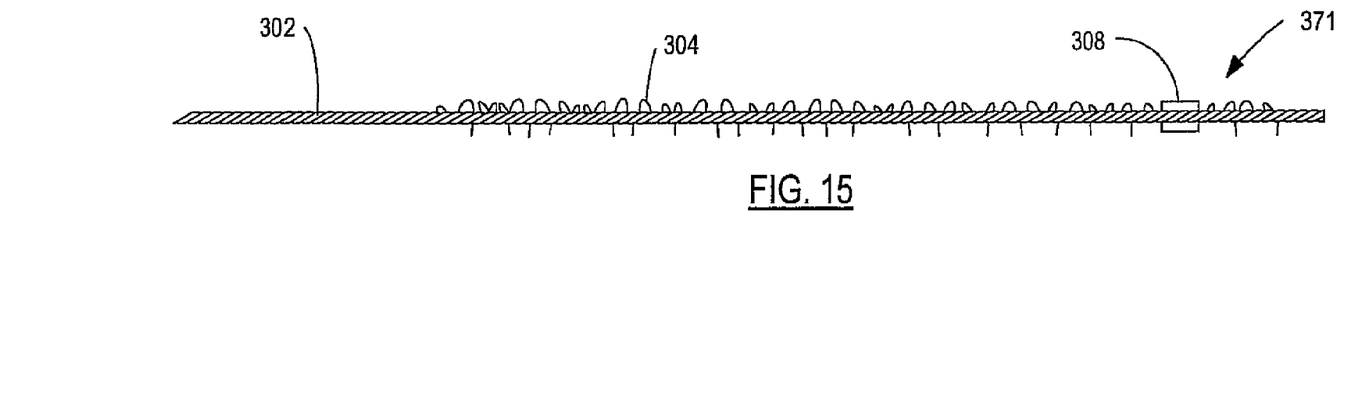
FIG. 15 is a side view of an alternative embodiment of a current collector.

In another aspect, the current collector 371 may include a catalyst 308 associated therewith. The catalyst 308 is preferably positioned on the stem or brush portions 302, 304 such that it is positioned immediately preceding the active area 344 of the fuel cell tubes 340, similar to the embodiments previously described above. The catalyst 308 can be associated with either the stem portion 302 or the brush portion 304. For example, the brush portion 304 may include a coating of catalyst or a coating of a catalyst supporting material. Additionally, the brush portion 304 may be formed of a catalytic material or the current collector may include a catalyst brush 312 extending radially out from the stem portion 302, as well as the current collecting brush 304, best seen in FIG. 16. The catalyst 308 may also be disposed on the stem portion 302, as shown in FIG. 15. Various catalytic materials may be used and include materials selected from Platinum, Rhodium, Iridium or alloys of the materials.

Figure 12:
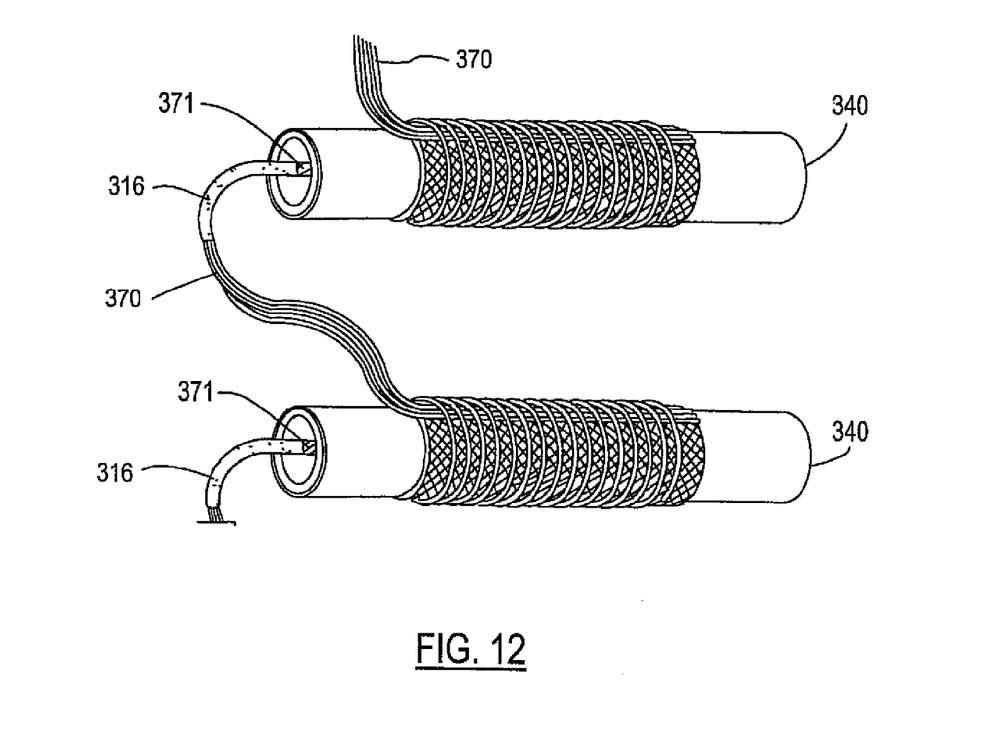
FIG. 12 is a perspective view of two tubes of the alternative embodiment of FIG. 11 connected in series.
Figure 13:
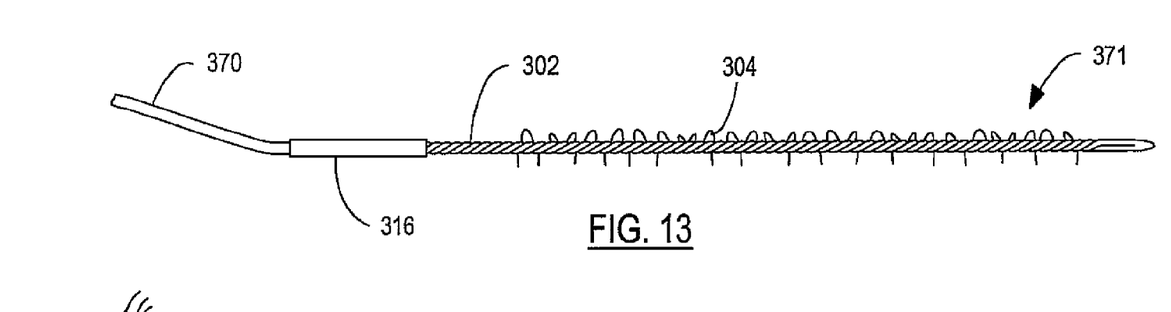
FIG. 13 is a side view of one embodiment a current collector.
Figure 14:
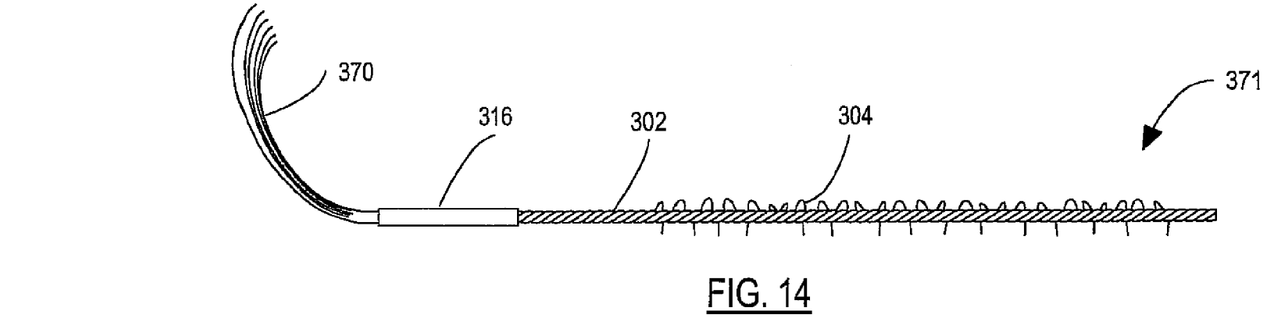
FIG. 14 is a side view of an alternative embodiment of a current collector.

Again referring to FIGS. 11 and 12, the current collector 371 may also include an interconnect portion 316 attached thereto. The interconnect portion 316 connects an anode 349 from one tube 340 to the cathode 348 of another tube 340 when connected in series as shown in FIG. 12. Additionally, the interconnect portion 316 may act as a lead, as will be described in more detail below. The interconnect portion 316 may be formed of a conductive material useful in the thermal and chemical environment selected from gold, platinum, palladium, noble metals or alloys, and oxidation resistant alloys of iron, nickel or cobalt.

Figure 16:
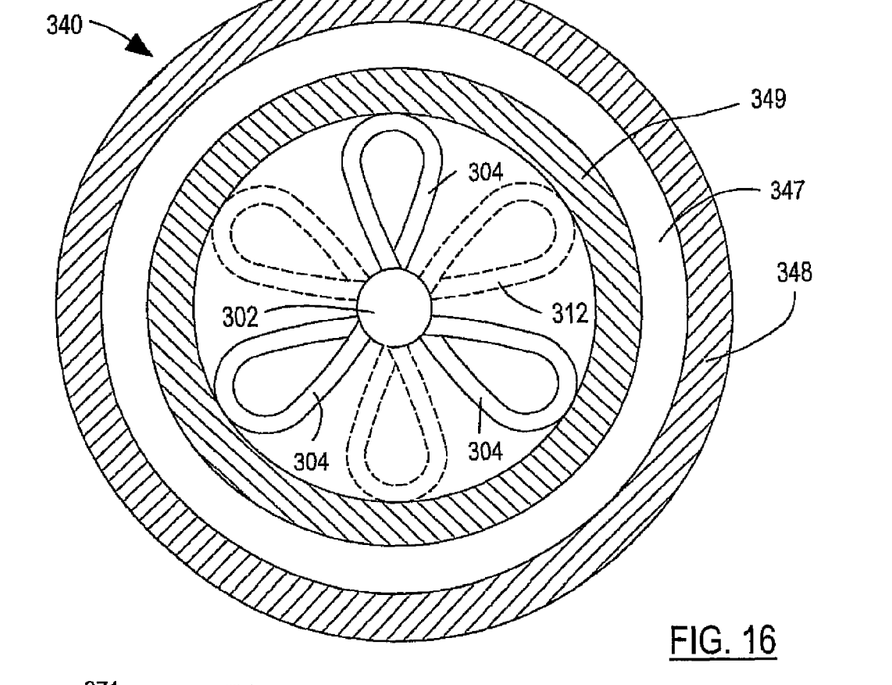
FIG. 16 is a sectional view of a tube including a current collector disposed on an interior of the tube.

In the alternative embodiment of a solid oxide fuel cell 310 and as described above, there is included a plurality of tubes 340 with each tube 340 having an anode 349, cathode 348 and an electrolyte 347. The solid oxide fuel cell 310 also includes an anode current collector 371 associated with each tube 340. The anode current collector 371 is mechanically compliant relative to the plurality of tubes 340. The term "mechanically compliant" refers to the ability of the brush portion 304 to reduce strains from the thermal expansion difference between the low resistance stem portion 302 and the material forming the plurality of tubes 340. As the brush portion 304 is compliant it can stay in contact both with the anode 349 of the fuel cell tube 340 and the stem portion 302 during changes in temperature, as best seen in FIG. 16. The loops of the brush portion 304 are compressed against the anode 349 formed on the interior of the tube 340. In an alternative aspect the looped wires of the brush portion 304 may be attached to the anode 349 by welding or brazing to the anode 349.

Figure 17:
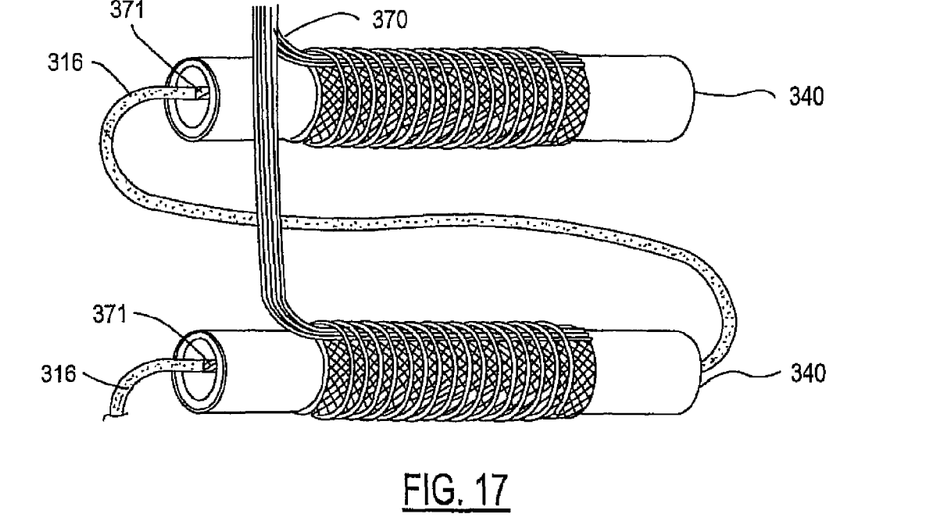
FIG. 17 is a perspective view of two tubes of the alternative embodiment of FIG. 11 connected in parallel.

In the depicted embodiment of FIGS. 11 and 12 there is shown an anode 349 on an interior of each tube 340 and a cathode 348 formed on an exterior of each tube 340. The anode current collector 371 includes the low resistance stem portion 302 and brush portion 304 previously described above. The anode current collector 371 may also include the catalyst 308, as described above. The anode current collector 371 extends from an inlet end 380 of the tube 340 to an outlet end 382 of the tube 340. The inlet end 380 corresponds to the inlet of the fuel and air while the outlet end 382 refers to the exhaust end of a fuel cell tube 340. The anode current collector 371 may also include an interconnect portion 316, as described above. The interconnect portion 316 may be positioned on the outlet end 3 82 and extends out of the tube 340 linking with the cathode 348 of an adjacent tube 340, as shown in FIG. 12. Alternatively, the interconnect portion 316 may be positioned on the outlet end 382 and extend out of the tube 340 linking with the anode 349 of an adjacent tube 340 when the tubes 340 are connected in parallel as shown in FIG. 17.

Again referring to FIGS. 11 and 12, it can be seen that the interconnect portion 316 may extend out of the end of the tube 340, as opposed to the previously described embodiments having an interconnect area 76 including a sealant 75. The interconnect portion 316 may be formed of various materials, as described above. In a preferred aspect, the interconnect portion 316 may be formed of gold. For example in an embodiment where the anode current collector 371 is formed of a copper alloy, the anode current collector should not extend outside of the tube as the materials can oxidize in the air-rich atmosphere of the cathode. The interconnect portion 316 may be joined with the anode and cathode current collectors 371, 370 using a variety of joining techniques including all welding techniques such as laser, ultrasonic, friction, electron beam, resistance, plasma and other types of welding. The interconnect portion 316 may also be joined using brazing, diffusion bonding, and mechanical forming operations. The interconnect portion 316 may also be used as a lead, when it is the first or last tube 340 in a series of connected tubes 340 or when the tubes 340 are connected in parallel or a combination of series and parallel connections. The interconnect portion 316 may be the lead extending out of the fuel cell or it may be further connected to a lead wire that extends out of the fuel cell.

While it is described above having an anode 349 formed on an interior of a tube 340, it should be realized that the position of the anode 349 and cathode 348 may be reversed such that the cathode 348 is formed on an interior of the tube 340 while the anode 349 is formed on an exterior of the tube 340. In such a design, the cathode current collector 370 may include a low resistance stem portion 302 and a brush portion 304 extending radially out from the stem portion 302, as described above with reference to the anode current collector 371. When the electrode is a cathode, the stem and brush portions 302, 304 may be formed of a metal material that is compatible with an oxidizing atmosphere and operating temperature of a solid oxide fuel cell. Metal materials that may be used for a cathode current collector 370 include: silver, gold, platinum or platinum alloys, and oxidation resistant alloys of nickel, cobalt or iron.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A solid oxide fuel cell comprising:
a plurality of tubes, with each tube having an interior anode, an exterior cathode and an electrolyte; and
an anode current collector associated with each tube;
wherein the anode current collector is mechanically compliant relative to the plurality of tubes and wherein the anode current collector includes a low resistance stem portion and a brush portion extending radially out from the stem portion and wherein the brush portion includes a plurality of wire loops radiating from the stem portion, each wire loop extending directly from the stem portion to a radially distal looped anode contact area.

2. The solid oxide fuel cell of claim 1 wherein the low resistance stem portion includes a ribbon wire.

3. The solid oxide fuel cell of claim 1 wherein the stem portion and brush portion are unitary.

4. The solid oxide fuel cell of claim 1 wherein the stem portion and brush portion are formed of a metal material compatible with a reducing atmosphere and with operating temperatures of a solid oxide fuel cell.

5. The solid oxide fuel cell of claim 1 wherein the stem portion is formed of a different metal material than the brush portion.

6. The solid oxide fuel cell of claim 1 wherein the stem portion and brush portion are formed of the same metal material.

7. The solid oxide fuel cell of claim 1 wherein the stem portion and brush portion are independently formed of a metal material selected from the group consisting of: copper, nickel, cobalt, iron, tungsten, molybdenum, tantalum, niobium, silver, gold, platinum, and alloys, blends, coatings and claddings of the metal materials.

8. The solid oxide fuel cell of claim 1 wherein the interconnect portion is formed of a material selected from gold, platinum, palladium, noble metals having a melting temperature above 1000 degrees centigrade, and alloys of iron, nickel or cobalt.

9. The solid oxide fuel cell of claim 1 wherein the anode current collector includes a catalyst associated therewith.

10. The solid oxide fuel cell of claim 1 including a cathode current collector on each tube.

11. The solid oxide fuel cell of claim 10 wherein the brush portion includes a coating of catalyst or catalyst supporting material.

12. The solid oxide fuel cell of claim 10 wherein the brush portion is formed of a catalytic material.

13. The solid oxide fuel cell of claim 10 further including a catalyst brush extending radially out from the stem portion.

14. The solid oxide fuel cell of claim 10 wherein the stem portion includes a catalyst or catalyst supporting material associated therewith.

15. The solid oxide fuel cell of claim 10 wherein the stem portion includes an interconnect portion attached thereto.

16. The solid oxide fuel cell of claim 10 wherein the cathode current collector includes a low resistance stem portion and a brush portion extending radially out from the stem portion.

17. The solid oxide fuel cell of claim 1 wherein the anode current collector includes an interconnect portion attached thereto.

18. The solid oxide fuel cell of claim 17 wherein the interconnect portion is formed of a material selected from gold, platinum, palladium, and noble metals having a melting temperature above 1000 degrees centigrade, and alloys of iron, nickel or cobalt.

19. The solid oxide fuel cell of claim 17 wherein the anode current collector extends from an inlet end of the tube to an outlet end of the tube.

20. The solid oxide fuel cell of claim 19 wherein the interconnect portion is positioned on the outlet end and extends out of the tube linking with the anode of an adjacent tube.

21. The solid oxide fuel cell of claim 19 wherein the interconnect portion is positioned on the outlet end and extends out of the tube linking with the anode of an adjacent tube.

22. The solid oxide fuel cell of claim 19 wherein the interconnect portion is positioned on the inlet end and extends out of the tube linking with the, cathode of an adjacent tube.

23. The solid oxide fuel cell of claim 19 wherein the interconnect portion is positioned on the inlet end and extends out of the tube linking with the anode of an adjacent tube.

24. The solid oxide fuel cell of claim 17 wherein the anode is formed of a nickel alloy, the cathode is formed of a silver alloy and the interconnect portion is formed of gold, wherein the interconnect portion acts as an oxygen barrier between the nickel and silver alloys.

* * * * *

UNITED STATES PATENT AND TRADEMARK OFFICE
CERTIFICATE OF CORRECTION

PATENT NO.       : 8,343,689 B2
APPLICATION NO.  : 11/566457
DATED            : January 1, 2013
INVENTOR(S)      : Aaron Crumm, Quinlan Shuck and Jonathan Rice It is certified that error appears in the above-identified patent and that said Letters Patent is hereby corrected as shown below:

In the Specification

Col. 1, line 13, please insert,

--This invention was made with government support under contract number W31P4Q-04-C-R164, awarded by the U.S. Department of Defense. The government has certain rights in this invention.--

Signed and Sealed this
Fifth Day of May, 2015

Michelle K. Lee
*Director of the United States Patent and Trademark Office*